United States Patent
LeClair et al.

(10) Patent No.: US 8,185,456 B2
(45) Date of Patent: May 22, 2012

(54) METHOD AND SYSTEM FOR STRUCTURING A MORTGAGE

(75) Inventors: Raymond A. LeClair, Acton, MA (US); Henry Evan C. Schulman, Boston, MA (US)

(73) Assignee: Crew Financial LLC, Maynard, MA (US)

( * ) Notice: Subject to any disclaimer, the term of this patent is extended or adjusted under 35 U.S.C. 154(b) by 755 days.

(21) Appl. No.: 11/440,420

(22) Filed: May 24, 2006

(65) Prior Publication Data

US 2007/0288354 A1 Dec. 13, 2007

(51) Int. Cl.
*G06Q 40/00* (2006.01)
(52) U.S. Cl. .......................................................... 705/35
(58) Field of Classification Search ...................... 705/35
See application file for complete search history.

(56) References Cited

U.S. PATENT DOCUMENTS

| | | | |
|---|---|---|---|
| 4,910,676 A | 3/1990 | Alldredge | |
| 5,745,885 A * | 4/1998 | Mottola et al. | 705/36 R |
| 5,875,437 A | 2/1999 | Atkins | |
| 5,946,668 A | 8/1999 | George | |
| 5,983,206 A | 11/1999 | Oppenheimer | |
| 6,070,151 A | 5/2000 | Frankel | |
| 6,088,685 A | 7/2000 | Kiron et al. | |
| 6,269,347 B1 | 7/2001 | Berger | |
| 6,330,547 B1 | 12/2001 | Martin | |
| 6,345,262 B1 * | 2/2002 | Madden | 705/38 |
| 6,671,677 B2 | 12/2003 | May | |
| 6,684,189 B1 * | 1/2004 | Ryan et al. | 705/4 |
| 6,823,319 B1 * | 11/2004 | Lynch et al. | 705/38 |
| 6,904,414 B2 | 6/2005 | Madden | |
| 6,941,281 B1 | 9/2005 | Johnson | |
| 7,555,451 B2 * | 6/2009 | Rugge et al. | 705/36 R |
| 2002/0004735 A1 | 1/2002 | Gross | |
| 2002/0019805 A1 | 2/2002 | Kalotay | |
| 2002/0046158 A1 * | 4/2002 | Kelly et al. | 705/38 |
| 2002/0095368 A1 | 7/2002 | Tran | |
| 2002/0107789 A1 * | 8/2002 | Wood | 705/38 |
| 2003/0204459 A1 | 10/2003 | Schulman | |
| 2003/0204473 A1 | 10/2003 | Schulman | |
| 2005/0021453 A1 | 1/2005 | Lyman | |
| 2005/0027647 A1 | 2/2005 | Bershteyn | |
| 2005/0114259 A1 | 5/2005 | Almeida | |
| 2005/0149431 A1 | 7/2005 | Delaney | |

(Continued)

FOREIGN PATENT DOCUMENTS

JP 2001344420 A 12/2001

(Continued)

OTHER PUBLICATIONS

Poland_Sep. 2003; "Poland Business Report Weekly"; Sep. 22, 2003; Supplier No. 108324425.*

(Continued)

*Primary Examiner* — Alexander Kalinowski
*Assistant Examiner* — Edward Chang
(74) *Attorney, Agent, or Firm* — Wolf, Greenfield & Sacks, P.C.

(57) ABSTRACT

Methods and systems are configured to structure a collateralized loan such that a borrower's future income is factored into the determination of payment amounts due to a lender. The methods and systems disclosed herein provide benefits to both lenders and borrowers and, regarding real estate purchases, may expand the pool of buyers that qualify for certain mortgage amounts.

32 Claims, 7 Drawing Sheets

U.S. PATENT DOCUMENTS

| | | | |
|---|---|---|---|
| 2005/0182702 A1 | 8/2005 | Williams, III | |
| 2005/0222940 A1 | 10/2005 | Schulman | |
| 2005/0246267 A1 | 11/2005 | Nichols | |
| 2006/0036465 A1* | 2/2006 | O'Donnell | 705/1 |

FOREIGN PATENT DOCUMENTS

| | | |
|---|---|---|
| JP | 2001357200 A | 12/2001 |
| JP | 2004 192303 | 7/2004 |

OTHER PUBLICATIONS

Braunstein, Sandra; Welch, Carolyn; "Financial literacy: an overview of practice, research, and policy"; Nov. 2002; ISSN: 0014-9209.*

PR Newswire; "Glacier Bancorp, Inc. Earnings for year ended Dec. 31, 1995"; Feb. 2, 1996, p202SEF008.*

LeClair, et al., "Sales Certificates: A New Scurity", Jul. 2004, pp. 1-18.

"Bowie Bonds," printed Feb. 4, 2009 from http://en.wikipedia.org/wiki/Bowie_Bonds.

"David Bowie Bonds," printed Jan. 31, 2009 from http://www.morevalue.com/themes/bowie.html.

Gliatech, Press Release, Apr. 26, 2011.

Huang, "Royalty-Based Venture Financing Born in Boston, Could Shake up VCs and Startups from New England to the Northwest", http://www.xconomy.com/seatlle/2009/10/07/royalty-based - venture-financing-born-in-boston-could-shake-up-vcs-and-startups-from-new-england-to-the-northwest/, Oct. 7, 2009.

Leone et al., "Revenue Interest Financing: A Strategic Alternative to Accessing Capital Through Licensing in the Life Sciences," Dec. 2008.

* cited by examiner

METHOD AND SYSTEM FOR STRUCTURING A MORTGAGE

FIELD OF THE INVENTION

The present invention relates generally to methods and systems for structuring collateralized loans such as mortgages, and more specifically to methods and systems for factoring a borrower's future income into a specification of mortgage payment amounts, including principal and interest payments.

DISCUSSION OF THE RELATED ART

A number of traditional mortgages exist for borrowers and lenders who desire to structure a collateralized loan to help with the purchase of real estate or other assets. For example, fixed rate mortgages often specify periodic payments, typically monthly, which ultimately lead to a full repayment of the principal amount of the loan in an established time frame. In the most common fixed rate loans, the payment amount typically remains the same throughout the term. For a fixed rate mortgage that includes steady monthly payments, the payments are structured such that a portion of each monthly payment is applied to all of the interest accrued during the prior month, and the balance of the payment is applied to the remaining principal. Based on the principal amount, the fixed interest rate, and the term of the loan (typically, 15, 20 or 30 years), a monthly payment amount is specified such that the principal is paid down to zero in the last month of the loan term.

Another well-known type of mortgage is an adjustable rate mortgage, which typically offers an initial interest rate for a specified period of time, and once the specified period of time has passed, adjusts the interest rate one or more times by an amount that is tied to any one of a variety of interest rate indexes. Because the interest rate may be changed for different time periods during the repayment of the loan, the required monthly payment from the borrower to the lender also can change, sometimes dramatically. The monthly (or other periodic) payment amounts for the time periods occurring after the initial interest rate period are specified in terms of the interest rate that eventually is used for these later periods. In other words, an algorithm for determining the payment amount is specified during the structuring of the mortgage, but the actual dollar amount of the later payments is not determined until the interest rate is adjusted in the future to a then known value.

Adjustable rate mortgages may allow a borrower to purchase a home which otherwise would not be affordable, by employing an initial interest rate that yields lower monthly payments early in the loan period as compared to fixed rate mortgages. A homebuyer may not, however, wish to take on the interest-rate risk associated with an adjustable rate mortgage in order to qualify for a larger loan amount. To lessen the borrower's exposure to the risk of greatly increasing interest rates, caps on the size of interest rate adjustment typically are included within an adjustable rate mortgage. Nevertheless, abrupt changes in payment amounts may come at a time when a borrower cannot afford to make such payments or when such increased payments present a financial strain.

Lenders decide whether to offer mortgages (and the amount of borrowing to offer) to borrowers based on a number of criteria, including current income, existing debts, credit history, credit rating, time at current job, current assets, the property the borrower wishes to purchase, the buyer's down payment, and other criteria. When reviewing a proposed mortgage, the lender assesses the likelihood that the borrower will remit the monthly mortgage payments in timely fashion, and factors this assessment into the decision on whether and how much to lend. Various ratios and other comparisons are often used to set limits or guidelines when deciding on whether to offer a mortgage or what size loan could be offered. For example, many lenders tend to not approve mortgages that result in payments for housing costs (e.g., mortgage payment costs combined with home insurance costs and property taxes) that exceed an number such as 28% of gross income.

Monthly payments of a consistent amount, such as those associated with a fixed rate mortgage, are typically more difficult to pay early in the loan term as compared to late in the loan term, because of the effects of inflation. That is, if a homeowner's income increase at the rate of inflation, the unchanging mortgage payment amounts become easier to pay as time passes. At the same time, a homeowner's actual earning capacity (in present value dollars) may be lower at the beginning of the loan term and higher toward the end of a loan term. For example, a homeowner who is enrolled in school or recently out of school, at the beginning of a loan term, or receives one or more promotions to a higher paying job(s) during the loan term, or has a spouse who initially is not in the workforce but later joins the workforce during the loan term, may see his or her earning power increase at a rate much greater than the inflation rate. In such a situation, the homeowner may be in a position to make much higher payments toward the end of a loan term as compared to the beginning of the loan term.

A prospective homebuyer, or other borrower, and a prospective lender may face a dilemma when the prospective homebuyer expects their income to increase, perhaps substantially, during the term of the loan. For a given desired loan amount, the prospective homebuyer's current income may not be sufficient to meet a lender's guidelines for approving the loan. And while the prospective homebuyer and the lender may be fully confident that during the course of the entire loan term the homebuyer will have an adequate income to pay for the total amount of principal and interest, the monthly payment associated with a fixed rate mortgage may be too high early in the loan term to allow the homebuyer to qualify for—or make payments on—the desired loan.

In such a scenario, the lender and borrower may explore adjustable rate mortgages or "interest-only" mortgages as an alternative, so that earlier payments are lower than they would be with a fixed rate mortgage. In certain economic environments, however, a borrower or lender might wish to avoid adjustable rate mortgages, or, as mentioned above, a borrower may not want to take on the interest rate risk associated with adjustable rate mortgages. Additionally, the difference between the fixed interest rate and the adjustable interest rate may not be adequate to lower the early monthly payments to an amount that would allow the borrower to be qualified for the mortgage amount he or she desires.

The above factors, and others, may lead to a prospective borrower and a prospective lender being unable to form a mortgage, or may lead to the formation of a mortgage which is much smaller than is the prospective borrower's financial and professional situation might allow. Home ownership is widely considered to be an important component of achieving financial health, and therefore the inability to obtain a mortgage can have long-term consequences for a prospective borrower. Further, the community in which a home is located and the associated school system are important aspects of purchasing a home. The lack of a suitable mortgage may lead a homebuyer to have to be content purchasing a home in a community other than one he or she desires. In some circumstances, the lack of a suitable mortgage may lead to purchasing a less expensive home (or other property) than desired, resulting in the buyer to "trading up" every few years. That is, initially the buyer purchases a first home having a price that allows him or her to qualify for the associated lower mortgage amount, and then sells the first home and purchases a more expensive home (perhaps in a community with a better school system) with a new mortgage once his or her income and/or assets have increased adequately to qualify for the higher mortgage amount. Eventually, perhaps after several moves, the homebuyer's income increases sufficiently and he or she is able to purchase a home in the community or at the level he or she originally desired.

Trading up, whether it be to a different community or a different house, comes with its own set of costs and risks. Each sale and purchase of a home may include broker's fees, closing costs, legal costs, moving costs, etc. Additionally, instead of moving frequently, the homebuyer may wish to stay in a home for an extended period of time to develop neighborhood and school ties and to avoid the inconveniences and costs associated with moving. Regarding risks, the market values for homes may decline substantially while the homebuyer is still in the initial home, and even though the homebuyer's income is increasing, the homebuyer may not be able to sell his or her home because he or she may not have adequate liquid assets to pay the difference between the amount of principal remaining on the mortgage and the expected sale price of the home.

Another risk is that market values increase substantially while the homebuyer is still in the initial home or other interim home. In this scenario, while the percentage increases in market value may be similar for both the current home and the home to which the homebuyer wishes to trade up, the absolute changes in the market value may be such that the higher-cost home remains out of reach.

Accordingly, there is a need for a mortgage structure which allows both the borrower and the lender to take a longer-term view of the borrower's ability to pay.

Another issue associated with traditional mortgages is that consistent payment amounts are due on a regular basis regardless of the borrower's financial ability to pay. For example, with a fixed rate mortgage, the same payment amount is due every month for a long period of time—up to 30 years, in many cases. If the borrower has a difficult time financially for a period of even a few months within the 30-year period, and cannot make their mortgage payment, the lender may start foreclosure proceedings, and the costs and inconvenience to both parties can be substantial. Additionally, the borrower's credit rating may be substantially harmed.

Accordingly, there is a need for a collateralized loan structure which inherently provides flexibility in payment amounts without necessarily requiring the forgiveness of payments, especially when the borrower is temporarily unemployed or in a difficult financial circumstance.

SUMMARY

Aspects of the present invention are directed to methods and systems configured to structure a collateralized loan such that a borrower's future income is factored into the determination of payment amounts due to a lender. The methods and systems disclosed herein provide benefits to both lenders and borrowers and, regarding real estate purchases, may expand the pool of buyers that qualify for certain mortgage amounts.

According to one embodiment of the invention, a method of structuring a collateralized loan includes a lender specifying to a borrower an algorithm for determining payment amounts due from the borrower to the lender for repayment of a collateralized loan, the payment amounts being a function of at least a future income of the borrower. The future income of the borrower may include a realized income measured in the future for a then-completed time period. The future income of the borrower may include a plurality of realized incomes measured in the future for a plurality of then-completed time periods. The algorithm for determining the payment amounts may be specified to determine a payment amount for a selected time interval as a function of the realized income. The percentage of the realized income may be specified to be computed at least by applying a multiplier to the realized income.

The loan may have a loan term and further include: providing a projected future income of the borrower; and determining a value for the multiplier, wherein said multiplier value would result in a full repayment of the loan at approximately the end of the loan term were a realized future income to equal the projected income. A value for the multiplier may be specified to remain constant throughout the loan term. A value for the multiplier may be specified to be changed during the loan term. A value for the multiplier may be specified to be redetermined during the loan term. The multiplier may be specified to be redetermined based on a change in an interest rate index. The multiplier may be specified to be redetermined based on a value of an interest rate index. The multiplier may be specified to be redetermined based on a change in the income of the borrower. The multiplier may be specified to be redetermined based on a value of the income of the borrower. The multiplier may be specified to be redetermined based on a principal of the loan reaching a selected threshold. The multiplier may be specified to be redetermined based on a change to the loan term. A value for the multiplier may be determined using at least a fixed interest rate. A value for the multiplier may be determined using at least a variable interest rate.

The method may further include specifying times for measuring a realized income and for determining payment amounts applicable to associated selected time intervals based on the measured realized income. At least one of the specified times for measuring a realized income may occur at or before a beginning of a selected time interval associated with the at least one specified time. At least one of the specified times for measuring a realized income may occur at or after completion of a selected time interval associated with the at least one specified time.

The method may further include: providing a plurality of income ranges for the future; measuring a realized income for a completed time period; determining which range of the plurality of income ranges includes the realized income; and determining a payment amount based on the range that includes the realized income.

The method may further include: specifying a future time for measuring a realized income; at the future time, computing an updated projected future income of the borrower based on at least the measured realized income; and determining an updated value for the multiplier, wherein said updated multiplier value would result in a full repayment of the loan at approximately the end of the loan term were a realized future income to equal the updated projected future income. The algorithm may specify a maximum payment amount limit for at least one of the payment amounts. The algorithm may specify a minimum payment amount limit for at least one of the payment amounts.

The future income of the borrower may include a projected future income. The projected future income may be at least in part set forth in a table including projected income values for a plurality of time periods. The projected future income may include a function which provides a projected future income value and which uses at least a baseline income and time as inputs. The algorithm for determining payment amounts may be specified to determine a payment amount for a selected time interval as a function of a percentage of the projected future income. The algorithm for determining payment amounts may be specified to determine the payment amount for a selected time interval to be the percentage of the projected future income. The percentage of the projected future income may be determined by applying a multiplier to the projected future income. A value for the multiplier may be specified to remain constant throughout a loan term. A value for the multiplier may be specified to be change during the loan term. The specified algorithm may provide for a value for the multiplier to potentially change based on at least one criterion. The at least one criterion may include a change in an interest rate index. The at least one criterion may include a value of an interest rate index. The at least one criterion may include a change in the income of the borrower. The at least one criterion may include a value of the income of the borrower. The at least one criterion may include a principal of the loan reaching a selected threshold. The at least one criterion may include a change to the loan term.

The method may further include determining a value for the multiplier, wherein said multiplier value would result in a full repayment of the loan at approximately the end of a loan term. A value for the multiplier may be determined using at least a fixed interest rate. A value for the multiplier may be determined using at least a variable interest rate.

The specified algorithm may determine payment amounts that will result in a full repayment of the loan at approximately the end of a loan term. The payment amounts may be a function of a plurality of projected future income values for a plurality of selected future time periods. The method may further include determining at least some of the payment amounts by using the algorithm and the plurality of projected future income values.

The method may further include specifying an amortization schedule for the payment amounts which are determinable with the algorithm, the amortization schedule specifying what amount of each payment amount is to be applied to paying interest and what amount of each payment amount is to be applied to paying principal. The method may further include the lender specifying to the borrower that the lender share in appreciation of the asset with which the loan is collateralized. The lender may share in appreciation of the asset with which the loan is collateralized if certain criteria are met.

The lender may specify to the borrower that the difference between a payment amount and amount of interest accrued is added to a remaining principal when the payment amount applicable to a time interval is less than the interest accrued during the time interval. The method may further include the lender specifying to the borrower that a term of the loan is extended when a payment amount for a time interval is less than an amount of interest accrued during the time interval. The method may further include the lender specifying to the borrower that an interest rate applicable to a time interval is reduced at least by an amount that is sufficient to avoid negative amortization of the loan that when a payment amount for a time interval is less than an amount of interest accrued during the time interval. The method may further include the lender specifying to the borrower the proportion of the appreciation of the collateralized asset that will be payable to the lender as a function of payment shortfall(s).

The collateralized loan may be a mortgage on certain real estate, and that real estate is the collateral.

According to another embodiment of the invention, a method of financing the purchase of an asset includes a lender entering into a contract with a borrower who is purchasing the asset, the contract providing that the lender will loan a principal amount to the borrower and the borrower will make loan payments to the lender during a loan term, the contract further providing that during at least a portion of the loan term, the loan payments will be made in an amount that is calculated as a function of a future income of the borrower.

The contract may provide that the future income of the borrower includes a projected future income of the borrower. The contract may provide that the loan payment amounts are determined to be a percentage of the projected future income of the borrower. The contract may provide that, at a selected point in time during the loan term, the projected future income of the borrower will be adjusted using a historical income of the borrower, the historical income having been received during a time period that ended at or before the selected point in time. The contract may provide that the projected future income of the borrower is calculated by applying a rate of increase to a historical income of the borrower. The contract may provide that at least one projected future income of the borrower is calculated based on a historical income of the borrower that occurred during a time period completed before a beginning of the loan term.

The contract may provide that the future income comprises a historical income to be measured at a point in time in the future, the historical income being measured for a time period that ended at or before said point in time. The contract may provide that loan payment amounts will be determined based on at least a historical income as time periods are completed. The contract may provide that a payment amount, which will be determined based on a historical income for a selected time period, will be used as a payment amount that applies to at least a portion of a loan interval that corresponds to the selected time period. The contract may provide that a payment amount, which will be determined based on a historical income for a selected time period, will be used as a payment amount that applies to at least a portion of a loan interval subsequent to the selected time period. The contract may provide that the loan payment amounts will be determined to be a percentage of the historical income.

The contract may provide that payment amounts will be calculated as a percentage of a future income of the borrower. The contract may provide that payment amounts will be limited to a maximum payment amount. The contract may provide that payment amounts will be limited by a minimum payment amount. The method may further include receiving values for the projected future income from an external entity. The method may further include computing values for the projected future income.

According to yet another embodiment of the invention, a method of pooling a plurality of collateralized loans includes entering into and/or purchasing a plurality of collateralized loans on the lender side, each loan having a borrower. Each loan specifies that the borrower will pay to the lender a payment amount, the payment amount to be determined at least in part as a function of income received by the borrower during an interval of a term of the loan. The collateralized loans may be mortgages and the collateral may be specified real estate. At least two of the collateralized loans may have a different entity as the respective borrower. In some embodiments, one or more conventional loans may be pooled with the plurality of loans.

According to another embodiment of the invention, a computer-readable medium having computer-readable signals stored thereon that define instructions that, as a result of being executed by a computer, instruct the computer to perform a method including an act of generating a value for a pre-qualification collateralized loan amount for a prospective borrower using at least: an estimated future income of the borrower, the estimated future income of the borrower being explicitly defined for at least a substantial portion of a loan term; an interest rate value; a loan term value; and a value for an upper limit on a percentage of the estimated future income of the borrower.

The method may further include acts of: multiplying the upper limit value and the estimated future income value for a plurality of time intervals within the loan term to compute a plurality of maximum payment amounts; setting a target value for a remaining principal as of a target date; and computing the largest loan amount that would result in the target value being met as of the target date if the plurality of maximum payment amounts were remitted. The estimated future income of the borrower may be explicitly defined for the entire loan term, the target value for a remaining principal may be approximately zero, and the target date may be approximately the end of the loan term.

According to a further embodiment of the invention, a computer-implemented system for structuring a collateralized loan between a lender and a borrower includes: a payment amount determination module configured to receive a value for a principal amount of the loan, a value for an interest rate, a value for an estimated future income of the borrower, and a value for a term of the loan. The payment amount determination module includes instructions that, when executed, compute payment amounts due from the borrower to the lender based on at least the principal loan amount value, the interest rate value, the estimated future income value, and the loan term value.

The payment amount determination module may be configured to receive a plurality of estimated future income values for a plurality of time periods which fall within the loan term.

According to another embodiment of the invention, a method of operating a computer system is provided. The computer system comprising a database which includes terms of a plurality of mortgages between borrowers and one or more lenders, and the method includes periodically gathering data regarding realized incomes for borrowers associated with a plurality of mortgages, and periodically determining payment amounts due for each of the plurality of mortgages based at least on the data regarding realized incomes.

According to another embodiment of the invention, a computer-implemented system for creating payment schedules for a plurality of mortgages, the system includes a payment amount determination service operative to receive a plurality of realized income values, each realized income value associated with each of the plurality of mortgages, and further operative to create a payment schedule for each mortgage using the associated realized income value and an associated algorithm.

According to a further embodiment of the invention, a method of determining a payment amount due from a borrower to a lender for a mortgage, and communicating the payment amount due to the borrower, includes: communicating, to the borrower, a request for realized income data; receiving the realized income data via a web site; retrieving terms of the borrower's mortgage; processing the terms using the realized income data as input to generate a payment due amount; and communicating the payment due amount to the borrower.

The method may further include communicating the payment due amount to the lender. The lender may perform the method.

All aspects of the invention need not be present in various embodiments of the invention, and one embodiment may instantiate multiple aspects.

DESCRIPTION OF FIGURES

FIG. 6 shows a method of assessing what size loan a borrower is qualified for;

DETAILED DESCRIPTION

Figure 1:
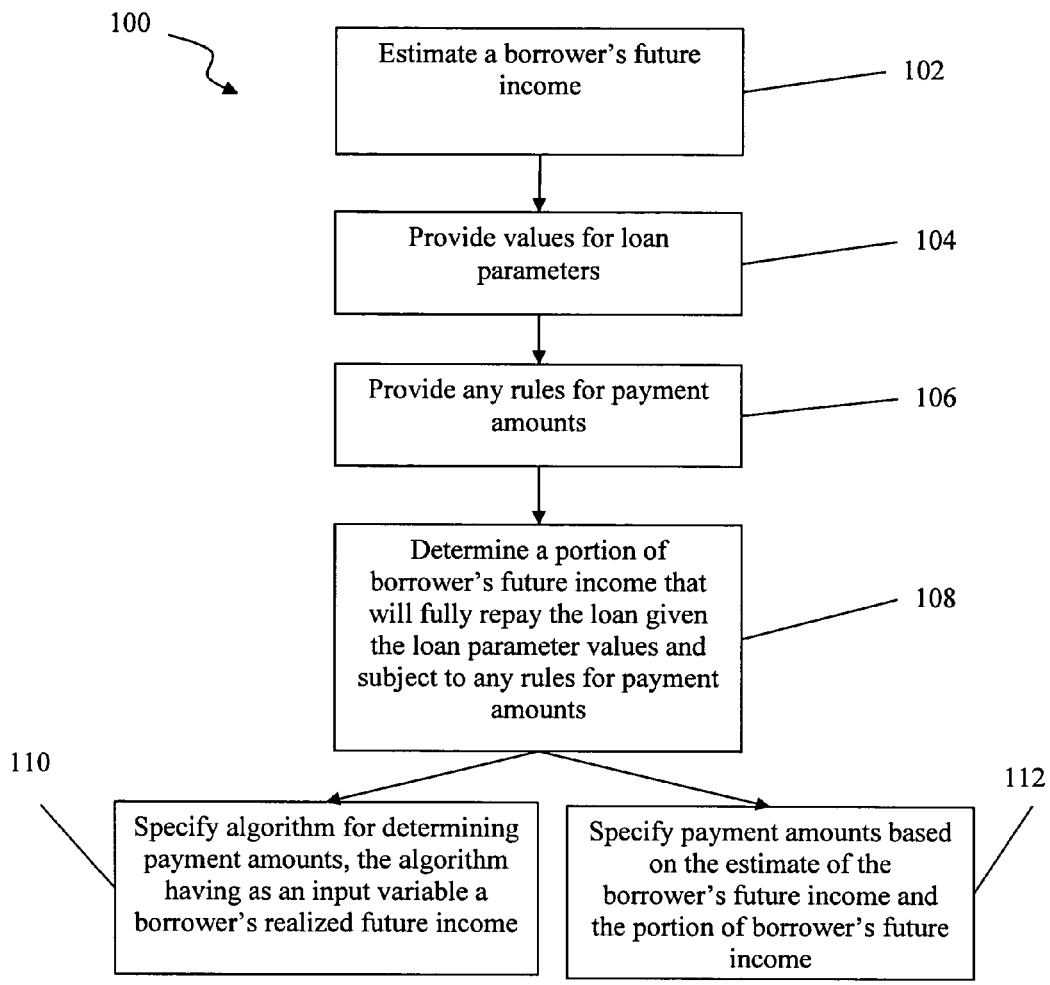
FIG. 1 shows a method of specifying payment amounts for a collateralized loan according to one embodiment of the invention.

According to one aspect of the present invention, prospective borrowers and lenders are afforded more flexibility in structuring a mortgage that may provide advantages to both parties. In one aspect, payment amounts for a collateralized loan, due to a lender, are based at least in part on the income of the borrower during a future period of time. For example, a mortgage may be structured so that the payments due to the lender on a monthly basis during a given year are determined by a function that includes, as an input, the borrower's income for the previous year. As the borrower's annual income increases, so do the payment amounts due to the lender. If the borrower's annual income instead decreases, then the payment amounts due to the lender also decrease—perhaps subject to some limits. Of course, the particular time periods over which income is measured may be varied. For example, instead of annually, income could be measured monthly, or once every two or more years. Similarly, payments may not be due on a monthly basis, but may be due at other regular or irregular intervals.

By linking the payment amounts to the income of the borrower, several advantages may be achieved. If the borrower has an unstable income, periods of low income may have a lesser chance of resulting in foreclosure as compared to a traditional mortgage. Avoiding foreclosure may benefit both the borrower and the lender, especially if the financial difficulties associated with the inability to pay are short-lived.

According to another aspect of the invention, future income values for a prospective borrower may be projected, and these estimates may be used to determine actual payment amounts that will be due in repaying the loan. For example, a prospective borrower may be employed in a profession in which annual increases in salary are estimated to be 5%. Using this estimate to prepare projected future income, a schedule of payment amounts may be specified for the entirety of a loan term based on the estimated annual income for each year (or other period, such as month) of the loan term.

An advantage to using a longer-range assessment is that the lender may expand the pool of borrowers that qualify for mortgages to include prospective borrowers who have a significant probability of increasing their incomes during the term of the loan. Further, a prospective borrower may increase the amount of a loan for which he or she can qualify, allowing him or her to purchase a property earlier than otherwise might be possible. The advantages provided to the borrower may permit the lender to use a premium interest rate or other compensation method. Further, a mortgage or loan structured according to embodiments disclosed herein may provide a lender with a steady, increasing revenue stream. In many instances, in addition to being able to make a larger loan, a lender may receive a larger total interest payment over the course of the loan if larger payments are made toward the end of the loan term as compared to the beginning of the loan term. This may occur, sometimes, even though interest rates, per se, may fall.

By structuring a mortgage which uses a longer-range assessment of a borrower's income, a borrower may be able to better leverage a down payment. In this respect, the promise of future income may be used to invest in an asset of greater value as compared to the asset value that could be leveraged with conventional loans.

For purposes herein, the term "income" means an amount of money, or equivalent, received by an entity during a period of time. In some embodiments, an income may be, for example: the gross annual income reported by the entity on tax forms (federal or state); the adjusted gross annual income reported by the entity on tax forms; earned wages over a time period; capital gains over a time period; gifts over a time period; net income over a time period; any combination of the above; or any other suitable measure of income. The term "income" may also mean an income rate for purposes herein. For example, in the phrase "the borrower has an income of $50,000", "income" may mean dollars per year (from included sources).

For purposes herein, the term "future income" means an income that is associated with a time period that ends at some time after the time of definition of the time period, or a time period that ends after the formation of a contract or loan or after an offer for a loan or contract is made. For example, a future income may be an income that is associated with the first year of a loan term, the first year being defined when the loan contract is offered or becomes effective. A "realized" future income is determined by measuring the income for an associated time period after the associated time period has been completed. For purposes herein, a realized future income or a realized future income value is considered to be a future income. A "projected future income", that is, an estimate of what the future income will be, also is considered to be a future income for purposes herein. For an income to be considered "projected," the projection is not required to be an extrapolation of prior or current income.

For purposes herein, a lender is considered to be an original lender who extended a loan and/or a successor to the lender (or successor), such as a third party that purchases a mortgage on the secondary market. A set of acts in which a lender performs some acts and a successor performs some acts would therefore be considered to have been performed by "a lender."

According to another aspect of the invention, a loan contract or mortgage may include an agreement to have a lender share in the appreciation of the collateralized asset should the asset be sold or the loan refinanced. Such a sharing of appreciation may be useful for loans in which the earlier payments do not fully amortize the original principal of the loan, or cover all of the accrued interest, resulting in the principal increasing during the earlier periods of the loan. The lender's share may be a multiple (where the multiple may be less than, equal to, or greater than one) of the proportion of the shortfall of payments over the principal value of the loan, or any arithmetic manipulation of the parameters of the loan.

One embodiment of a method of specifying an algorithm for determining payment amounts is shown in FIG. 1. In an act 102, a borrower's future income is estimated. The estimate may be performed by the lender, the borrower, a third party, or a combination thereof. The estimation may be based on several factors, including, but not limited to: previous income; current income; current assets; education; historical compensation data of industry in which borrower is employed; local, state, or national economic data and projections; geographic location; inflation data; expert opinions; and any other suitable factors. The estimate of the borrower's future income may be in the form of a lookup table, or a function which provides an estimated future income and which uses at least a baseline income and time as inputs, or any other suitable data structure for communicating a value or values for a future income estimate.

In an act 104, values for various loan parameters are provided. The values may represent current values, and the values may include estimates of future values. For example, a current interest rate may be provided in act 104, or, in some embodiments, estimates or probability distribution functions of future interest rates may be provided. Examples of loan parameters for which values may be provided include: principal amount; term of the loan; interest rates; and payment intervals.

In an act 106, rules, such as minimum payment amounts or maximum payment amounts, may be provided. Minimum payment amounts may be provided within the algorithm (among other reasons) to avoid a situation where the borrower intentionally reduces his or her income to substantially reduce payment amounts. At the same time, maximum payment amounts may be provided to avoid substantially larger payment amounts than expected due to a sudden increase in income or a one-time influx of income. Other rules such as maximum or minimum total payment amounts across several payment intervals may be provided. Rules regarding stepwise functions may be provided in act 106. For example, payment amounts may be specified to increase or decrease only in increments of $100. Thus, when a payment amount is determined by computing a percentage (i.e., a portion) of the borrower's income, the payment amount may be rounded to the nearest, next higher or next lower $100. Or, alternatively, discrete payment amounts may be associated with ranges of income. The association of discrete payment amount to ranges of income may be set out in a lookup table, or defined mathematically, or put forth in any other suitable manner.

In an act 108, a portion (such as a fraction, percentage, or other portion) to be applied to the borrower's estimated future income is determined. A percentage may be determined by computing that percentage of income, when applied to the entire data set of the estimated future income, which will result in the principal being fully paid during the final loan interval. To perform such a computation, a spreadsheet or other software application may be used, such as an application written for the MATLAB™ tool of The MathWorks, Natick, Mass., USA, may be used to determine the percentage of income that results in full repayment of the loan. In a spreadsheet, a set of relations between cells may be used with a cell for a percentage value being identified for iteration until a cell for final principal equals approximately zero.

For example, given a loan amount of $300,000, a fixed annual interest rate of 6%, monthly payment intervals, a 30-year loan term, an initial borrower income of $100,000, an annual borrower income increase rate of 5%, and no rules regarding minimum or maximum payments, a spreadsheet or MATLAB program may be configured to determine that percentage of the estimated income that will result in full repayment. In this example, monthly payments equal to approximately 0.964% of the borrower's annual income (for the year in which the payments are coming due) results in full repayment of the loan (principal and interest) during the last month of the 30-year loan term.

With this computed percentage, at least two types of approaches to payment determination are possible. Regarding a first type of approach, in an act 110, the computed percentage may be used as part of the specified algorithm for determining payment amounts when measurements of realized income become available (e.g., annually). A second type of approach includes, in some embodiments, an act 112 of determining payment amounts for the entire loan term before the loan term has started.

When using the first type of approach for determining actual payment amounts once realized future incomes are known, the realized incomes are likely to differ from the estimated future incomes used in act 108 when determining that percentage of the borrower's income that should be used in determining payment amounts. Because of this difference, the total payments from the borrower to the lender may move ahead, or fall behind, the total payments that would occur if realized income were to track the estimated income used in act 108. When such a discrepancy occurs, several options are available. The loan may be structured such that after each time period (or after several time periods), act 108 is repeated for the remaining term of the loan. In this manner, if the borrower's realized incomes for some or all of the remaining time intervals repeatedly fall short of the estimated incomes, and hence payments remitted also fall short of the original estimates, the percentage of income to be used in determining payment amounts may be adjusted upwardly (possibly subject to some ceiling). The upward adjustment may be computed such that the loan will be fully repaid at the end of the loan term assuming realized incomes track estimated income going forward. As part of this option, the estimated income values may be adjusted to take into account the measured income values that have occurred within the loan term.

Another option for addressing a discrepancy between the realized incomes and the estimated incomes is to extend the term of the loan. In this manner, the periodic payments may be left unadjusted, but the number of payments may be increased. As part of this option, the interest rate for some or all completed loan interval(s) may be adjusted to avoid negative amortization of the loan.

A further option for addressing the discrepancy is to continue with the same payment algorithm, and create or add to a lump-sum payment obligation due at the end of the loan term. In some embodiments, as described further below, packaging two or more loans together may help to smooth out volatility in the payment amounts for a single loan.

The second type of approach for determining actual payment amounts may include establishing set payment amounts that are not dependent upon realized incomes. In this manner, a complete payment schedule may be established at or before the beginning of the loan term based on the estimated income of the borrower, with the realized income of the borrower having no effect on the payment amounts.

In one embodiment of this second type of approach for determining payment amounts, in an act 112, the percentage that was determined in act 108 is multiplied by the estimate of future income for each income period to determine payment amounts for the various payment intervals. Even though payment amounts may be determined before the loan is made with this type of approach, act 112 and other suitable equivalent acts are considered to be a specification of an algorithm for determining payment amounts.

Figure 2:
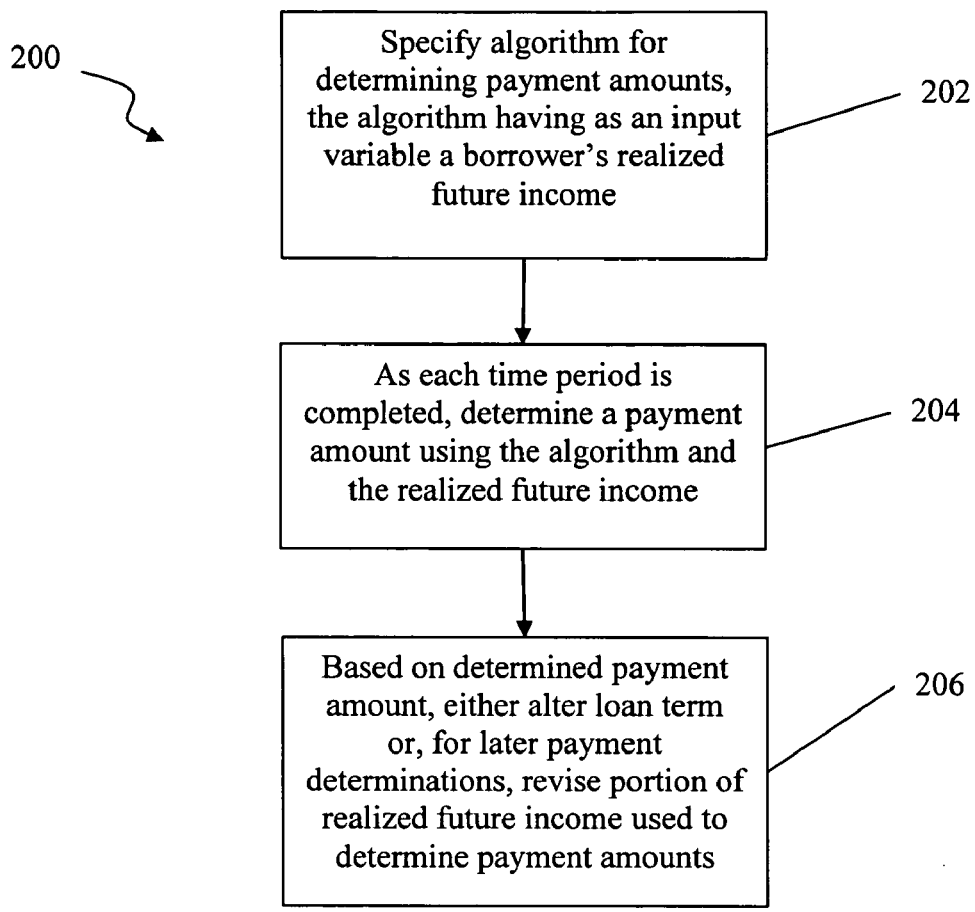
FIG. 2 shows a method of determining payment amounts for a collateralized loan according to one embodiment of the invention.

A method 200 of determining payment amounts due from a borrower to a lender for a collateralized loan, according to one embodiment of the invention, is illustrated in FIG. 2. Method 200 typically is performed by a lender, but other entities such as a successor to the lender, the borrower, or a third party may perform some or all of the acts described.

In an act 202, an algorithm is specified for determining payment amounts for the repayment of a collateralized loan. The algorithm has, as an input, a realized future income of the borrower. As described above, a realized future income is a future income in the sense that the income is associated with a time period that ends at some time after the time of definition of the time period or after the time of formation or offering of the loan or contract. For example, a future income may be an income that is associated with the first year of a loan term, the first year becoming a defined time period when the loan contract is offered or becomes effective. Once the first year is completed, the income of course is no longer in the future, but for purposes herein, the amount of income received during the completed time period is considered to be a "realized future income" or a "realized income". When an actual value for the realized future income is determined, the amount may be referred to as a "realized future income value".

The specified algorithm of act 202 may be a single operation function such as a function that defines a payment amount to be equal to a realized future income value adjusted by a multiplier. For example, in one embodiment, the monthly payment for year (x) may be 1% of the realized annual income from the previous year (x−1):

$$\text{Monthly Payment Amount for Year}(x) = 0.01 * (\text{Annual Income from Year}(x-1)). \quad (1)$$

In other embodiments, a multiplier other than 1% may be used, and the multiplier may vary during the term of the loan.

In some embodiments, the algorithm may incorporate a minimum payment amount, a maximum payment amount, graduated multipliers, step-wise payment amounts (i.e., payment amounts increase or decrease at selected intervals triggered by specified income thresholds), any combination of the preceding, or other suitable rules. As an example of a minimum payment amount, a monthly payment amount for each month of year 2 could be specified to be $520 plus 15% of the average monthly income that the borrower received during year 1. In this example, if the borrower had an average monthly income of $4,000 for year 1, then the monthly payments due during year 2 would be $1,120. For purposes herein, a "multiplier" is intended to encompass any value, operation or computation which is used to determine a portion of another value. For example, a multiplier as it relates to a measured income, may be a percentage, a fraction, a divisor, a multiplier, or any other suitable element.

The specified algorithm may include other inputs for which values are entered at a future time. For example, at the beginning of year 4 of a loan term, the algorithm may be specified to determine a payment amount as a function of a then-known interest rate index value as well as a then-known year 3 realized future income. Other possible inputs to be included in the specified algorithm, for which values may be entered at a time of executing the algorithm to determine a payment amount, include (but are not limited to): a remaining principal amount; a remaining term of the loan (if the term of the loan is adjustable during the loan term); a credit rating; and an amount of interest paid up through the time of executing the algorithm. Of course, any combination of the above-listed inputs, or further suitable inputs may be included in the specified algorithm.

The specified algorithm may be structured to determine payment amounts for one or more loan intervals. For example, once per year the algorithm may determine monthly payment amounts for the subsequent year. Or, as another example, in some embodiments the algorithm may determine annual payment amounts for the subsequent five years.

The algorithm is typically specified at or before formation of the loan, although values for various inputs may not be known until periods of time are completed. As each time period passes, the realized future income for the then-completed time period is measured, and in an act 204, a payment amount is determined using the algorithm and the measured realized future income. In one example, a realized future income for a just-completed year-long time period may be measured to be $50,000. The specified algorithm of Equation (1) may be used to determine monthly payment amounts for the subsequent year to be $500, in some embodiments.

In some embodiments, instead of determining payment amounts for a subsequent time period, the specified algorithm may be used to determine a payment amount for the just-completed loan interval. For example, the algorithm may specify a payment amount for the just-completed year to be 12% of realized income. With a measured realized income of $50,000 over the previous year-long time period, the algorithm would determine the payment amount to be $6,000. Had monthly payments been made and had they totaled less than $6,000, the balance would then be due.

The time periods used for measurement of realized income may be associated with payment amounts due for loan intervals which are not coincident, overlapping or even adjacent to the time periods. For example, an income may be measured for a completed time period, and the value of the income from that time period may be used to determine payments due three years later. Additionally, the length of the time periods used for income measurement need not equal the length of the loan intervals for which the income measurement is used in determining the payment amounts. For example, in some embodiments, the realized income over a previous year may be used in determining the payment amount for a subsequent month. With each passing month, a previous year (now shifted forward by one month) may be used to determine the subsequent month's payment amount.

Once the payment amount is determined, or once the realized income for a given time period is known, a comparison may be made with the estimate of the borrower's future income if an estimate was performed as part of the specification of the algorithm for determining payment amounts. This comparison may reveal a shortfall in the payment amount (or amounts), which could result in the loan not being repaid by the end of the loan term if later payments do not surpass previous expectations. To compensate for such a situation, the algorithm may include instructions in an act 206 for extending the loan term and/or adjusting payment amount determinations including having the lender share in the appreciation of the collateralized asset. For example, if the determined payment amounts fall behind the estimated payment amounts by a selected amount, the algorithm may re-compute the percentage of income that is used to determine payment amounts. Some algorithms may boost the minimum and/or maximum payment amount. Another option is to extend the loan term by an amount of time that is estimated to be sufficient for repaying the entire loan. Another option is to calculate the lender's share of the appreciation in the value of the collateralized asset as a multiple (where the multiple may be less than, equal to, or greater than one) of the proportion of the shortfall of payments over the principal value of the loan, or as any arithmetic manipulation of the parameters of the loan. Act 206 is optional, and in some embodiments, no comparison is made between realized income and any estimate of the borrower's income that was used in specifying the mortgage.

Figure 3:
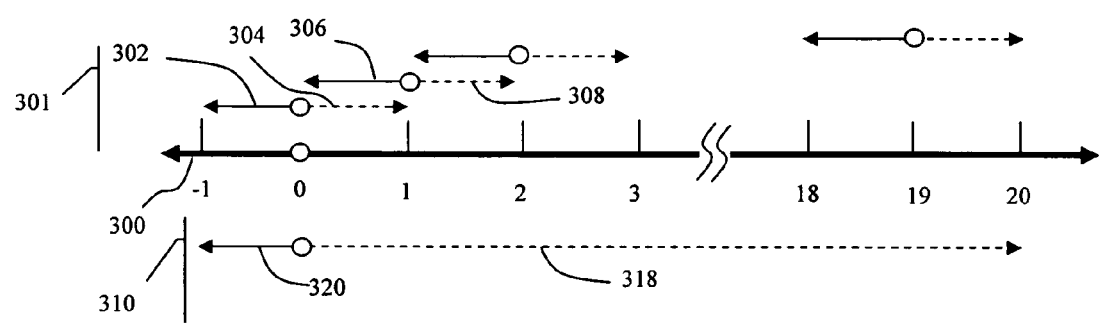
FIG. 3 shows a timeline of a loan term.

FIG. 3 shows a timeline 300 of one example of a collateralized loan that may be helpful for visualizing embodiments of the methods and systems described herein. In this example, a lender provides a loan to a borrower at year zero, and the borrower agrees to make payments, the amounts of which are determined based, at least in part, on his future income.

In a first embodiment, shown above the timeline at 301, an algorithm is specified at year zero, and the algorithm provides a method for determining payment amounts for each year at the beginning of each year. For example, at the beginning of the loan term (mark "0"), the borrower's income from the previous year (solid line 302) is measured, and the realized income value is used for the computation of payment amounts for the first year (dashed line 304). Once the first year has been completed, the realized income of the first year (solid line 306) is measured, and payment amounts for the second year (dashed line 308) are determined using the realized income value from the first year. These annual determinations continue through the beginning of the twentieth and final year of the loan term in this example. In this manner, when the loan repayment algorithm is specified at time zero, the payment amounts are specified to be a function of the future income of the borrower in the sense that borrower's income is in the future relative to the effective date of the contract or the time of specification of the algorithm. Of course, some of the payment amounts may be determined based on the borrower's income from a time period prior to the effective date of the contract. For example, the payment amounts for the first year of the loan term may be determined based on the borrower's income from the prior year or some other prior time period.

The payment amounts may be for weekly, bi-weekly, monthly, bimonthly, or annual payments, or payments for any other suitable payment intervals. The determination of the payment amounts may be based on a function that defines a linear relationship between income and payment amount, and, in some embodiments, maximum and minimum payment amounts additionally may be specified. In some embodiments, a non-linear relationship between income and payment amount may be used. For example, the percentage of income applied to a following year's payment amount may decrease as income increases. In some embodiments, a discontinuous relationship may be used, for example, discrete bands of income values may be associated with discrete payment amounts.

More complicated algorithms may be employed in some embodiments, such as including values for interest rate indexes and/or other indexes within the functions that are used at the beginning of each year to determine payment amounts for the following year. Other factors, such as the amount of principal remaining and/or the total amount of payments made to date, may be specified to be part of the function used each year as well. For example, the algorithm may adjust functions for determining payment amounts if the history of payment amounts strays too far (i.e., more than a threshold amount) from an original prediction of payment amounts or income. At the beginning of each year, the probability of the loan being fully repaid by the end of the loan term may be assessed and the payment determination functions may be adjusted to bring the loan repayment schedule closer to the original predictions or estimates. For these assessments, the entirety of the remaining loan term may be examined, or certain target points may be used. For example, at the beginning of the $11^{th}$ year, the algorithm may assess the probability of hitting a target amortization at the beginning of the $16^{th}$ year. Or, in some embodiments, the algorithm may assess the probability of full repayment by the end of the $20^{th}$ year. Based on the results of these assessments, adjustments to the percentages of income to be applied to following year payments may be made.

As with other embodiments described herein, payment amounts do not necessarily need to be determined for a following year based on a prior year. In some embodiments, the measurement of the realized income of the first year may be used to determined the payment amount for the first year (rather than the second year), or other following year. Furthermore, when determining payment amounts for a following year, the payment amounts do not necessarily have to be for an immediately following year.

In a second embodiment, shown below timeline 300 at 310, future income of the borrower is used as part of the determination of payment amounts, but in this embodiment, the future income is a projected future income. Instead of specifying an algorithm that is then used at the beginning of a year as time passes, an estimate of the borrower's future income is explicitly set forth and payment amounts are determined at or before time zero. For example, at time zero, payment amounts may be determined for the entire term of the loan (dashed line 318) based on the projected income of the borrower during the various periods of the loan term. In this manner, the payment amounts are determined based on, at least in part, the future income of the borrower, although the future income is estimated instead of measured. The projected future income of the borrower may be based in part on previous realized income, such as income from a time period before the loan contract is formed (solid line 320).

A combination of these two approaches may be used in some embodiment. For example, specific payment amounts may be determined for the first 5 years of a loan based on an estimated borrower income, while payment amounts for the remaining 15 years of the loan may be specified to be determined based on realized incomes as they occur.

Figure 4:
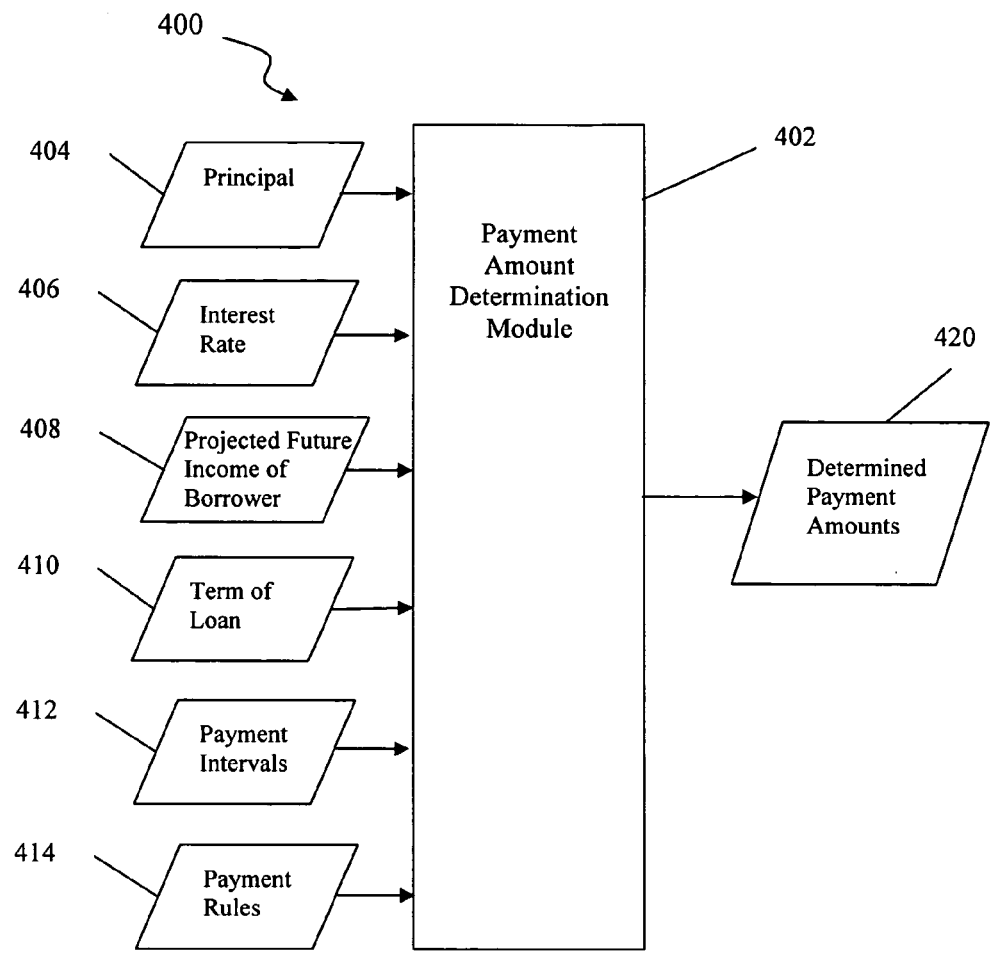
FIG. 4 is a diagram of dataflow within one embodiment of a mortgage-structuring system.

FIG. 4 is a diagrammatic illustration of dataflow for one embodiment of a mortgage structuring system 400. In this embodiment, various parameters are provided to a payment determination module 402. Using these parameters, payment determination module 402 determines payment amounts for each time period of the loan term. The payment amounts determined using this embodiment may be in the form of defined monetary payments which are due according to a set schedule that does not change unless explicitly amended through an agreement by both the borrower and the lender.

The parameters supplied to payment determination module 402 may include: a value for a principal of the mortgage 404; a value for an interest rate 406; a value or values for a projected future income of the borrower 408; a value for a term of the loan 410; a definition of payment intervals 412; and payment rules 414.

Value for an interest rate 406 may be a fixed interest rate that applies to the entire loan term. Instead of providing a fixed interest rate, in some embodiments, a set of different interest rate values may be provided for each of a set of loan intervals to payment determination module 402 as an estimate of interest rates for future loan intervals. In this manner, the association of different interest rates to different time intervals somewhat imitates variable interest rate loans. These estimates may be provided only for early portions of the loan term in some embodiments because of the uncertainty of the actual interest rate values that will exist in the future. When these estimates are applied only to early portions of the loan term, a fixed interest rate may be used for the remainder of the term. In some embodiments, value for an interest rate 406 may vary during the course of the loan term according to a formula that includes an interest index or indicies. For example, the interest rate may vary annually based on a certain interest rate index.

The value(s) provided for the borrower's future income 408 may be in the form of a lookup table, a function which provides an estimated future income and which uses at least a baseline income and time as inputs, or any other suitable data structure for communicating value(s) for a future income estimate. In some embodiments, projected future income values 408 may not be provided for the entire loan term. That is, in some embodiments, payment amounts for certain loan intervals may be determined without taking a future income of the borrower into account, while payment amounts for other loan intervals are determined using the projected future income of the borrower.

Values for payment intervals 412 may be provided as a table of specific payment dates. In some embodiments, payment intervals may be provided as set intervals (such as monthly or annually) starting with a start date of the mortgage.

Payment rules 414 may include any limits, triggers or thresholds that alter payment amounts that otherwise would be determined by a function. For example, a maximum payment amount rule may be provided to payment determination module 402 such that if a function determines a payment amount to exceed the maximum payment amount, payment determination module 402 outputs the maximum payment amount instead. Payment rules 414 may also include flexibility rules, for example, allowing a lump sump payment of a certain amount at the end the loan term. A lump sum payment cap may be included in the mortgage to limit the amount that may be deferred to the end of the loan. Payment rules 414 also may include maximum and/or minimum percentages of the borrower's income which may be applied to mortgage payments, or in some embodiments, the maximum and/or minimum percentage of the borrower's income that may be applied to housing costs (including mortgage payments).

Any of the values described above, or any other suitable value, may be provided to payment determination module 402 as a function that depends on another parameter such that specific numerical values are not necessarily provided. For example, a value for interest rate 406 may be provided as an equation expressing that a fixed interest rate be provided as 0.1% added to a value of an indexed interest rate. The indexed interest may be provided as a separate parameter to payment determination module 402.

Payment determination module 402 uses the provided parameter values to determine payment amounts that lead to full repayment of the mortgage, i.e., full repayment of the principal and interest. At least some of the determined payment amounts may be determined by applying a rule or a function that explicitly uses a projected future income of the borrower as an input. In some embodiments, algorithms or functions may be generated by amending existing algorithms or functions.

In some embodiments, payment amount determination module 402 may use various lender parameters as inputs. For example, a lender may use payment amount determination module 402 as part of deciding whether to offer a mortgage. In this regard, a minimum return on investment (ROI) value, a target ROI value, or other lender parameters may be provided to payment amount determination module 402. Because in some embodiments the interest rate paid by the borrower and the return earned by the lender may differ at various times during the term of the agreement, a modified interest rate 406 (or other parameters) may be provided to payment amount determination module 402 so that the terms of the agreement ensure the lender earns a specified return.

Figure 5:
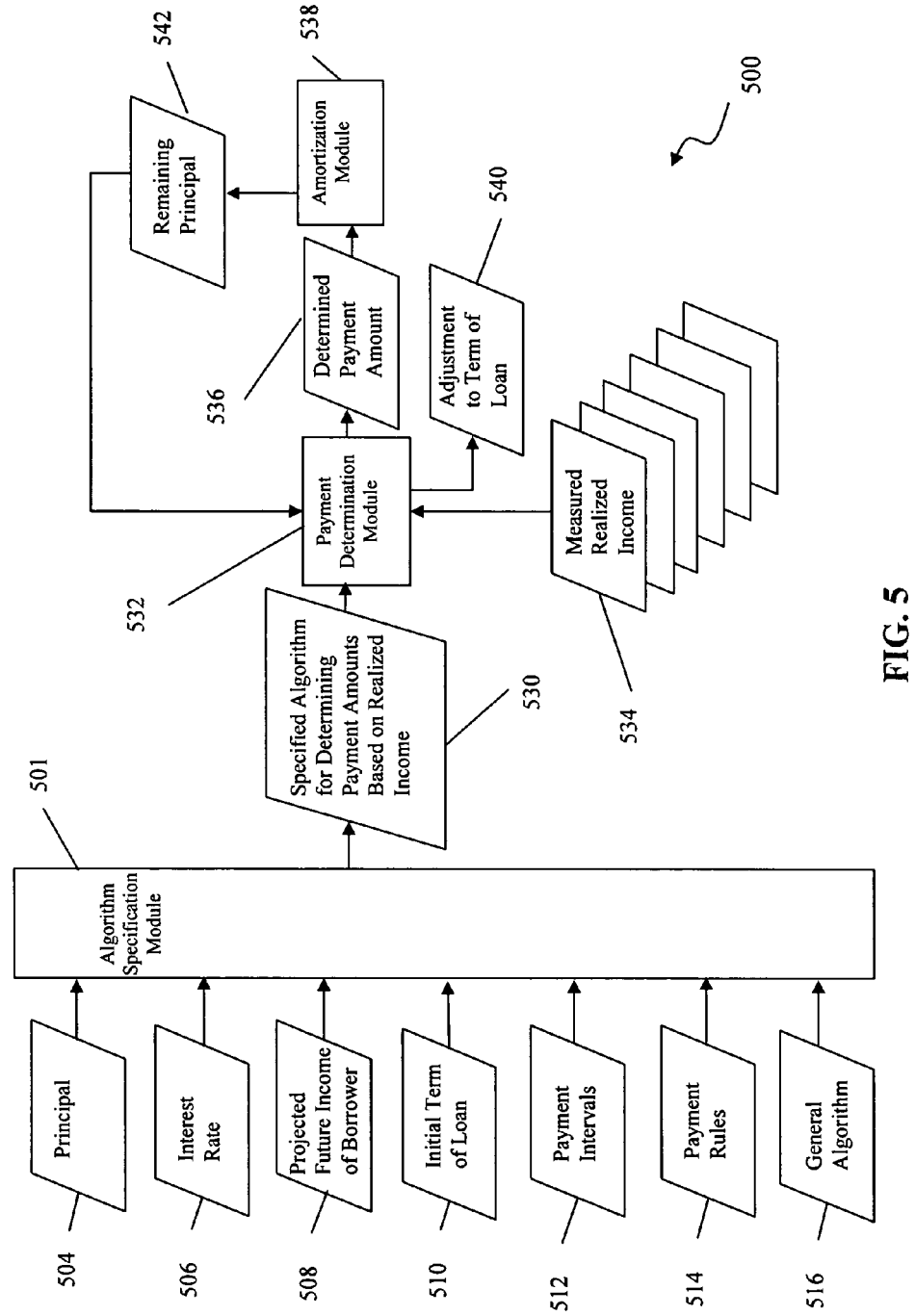
FIG. 5 is a diagram of dataflow within one embodiment of a mortgage-structuring system.

FIG. 5 is a diagrammatic representation illustration of data-flow for one embodiment of a mortgage structuring system 400 in which monetary payment amounts are determined as income is realized by the borrower during the loan term. Similar to the embodiment described with reference to FIG. 4, a number of parameters are provided to a module. Unlike the embodiment of FIG. 4, however, the module (in this embodiment, an algorithm specification module 501) does not necessarily provide monetary payment amounts as output, but instead specifies an algorithm for use in determining payment amounts as the loan term progresses.

The parameters supplied to algorithm specification module 501 may include: a value for a principal of the mortgage 504; a value for an interest rate 506; a value or values for a projected future income of the borrower 508; a value for a term of the loan 510; a definition of payment intervals 512; and payment rules 514. Instead of, or in addition to, payment rules 514, a general algorithm 516 also may be provided to select a general structure of the algorithm to be provided by algorithm specification module 501. For example, general algorithm 516 may prescribe that, assuming the projected future of the borrower turns out to be the actual realized income of the borrower, the percentage of the borrower's income used in a specified algorithm for determining payment amounts 530 should result in full repayment of the mortgage during the final time interval of the loan term.

By contrast, another general algorithm 516 may prescribe that, for example, the specified algorithm should determine payment amounts based on a constant percentage of income that falls somewhere in the range of 12%-25% based on the values for various parameters, but not including values for the projected future income of the borrower parameter. In other words, algorithm specification module 501 may specify an algorithm that uses realized income values as inputs, but this algorithm may be produced without an explicit estimation of the future income of the borrower. For example, a lender may pre-approve a borrower for a conventional mortgage that includes constant payment amounts, and then, based on the historical and/or current income of the borrower, specify a percentage of realized future income to be the payment amounts. The percentage specified may be such that during the first year, the payment amounts are equal to the payment amounts that would have been due under the conventional mortgage. The lender may feel secure, based on the financial or professional situation of the borrower, that the borrower's income will remain the same or increase over the term of the loan, and therefore the payment amounts will be greater than or equal to the payment amounts of the conventional loan for which the borrower was pre-approved (the pre-approval having occurred without consideration of an explicit future income estimate). In this embodiment, the borrower would not necessarily be able to qualify for a larger mortgage than with a conventional mortgage, but other advantages may be achieved. As should be evident, with a mortgage structured in this manner, a value for the projected future income of borrower 508 would not be provided to algorithm specification module 501.

As mentioned, algorithm specification module 501 outputs specified algorithm 530 which may then be used by the lender, borrower, or a third party, to determine monetary payment amounts. Specified algorithm 530 is provided to a payment amount determination module 532, which is configured to receive values of measured realized income 534. In some embodiments, the measured realized income values 534 are received once per year, although other periods may be used.

Payment amount determination module 532 computes a determined payment amount 536 (or amounts) based on specified algorithm 530 and the value for measured realized income 534. Determined payment amount 536 is sent to an amortization module 538 which applies a portion of the payment amount to interest and a portion of the payment amount to the principal. Of course, in some cases, the portion of the payment applied to either interest or principal may be zero. Amortization module 538 may be pre-supplied with instructions as to the apportionment of payment amounts to principal and interest, or these instructions may be included within specified algorithm 530 and passed to amortization module 538 from algorithm specification module 501.

In some embodiments, amortization module 538 may use a typical amortization method of first applying as much of the payment to interest as is needed to cover the interest for the loan interval that has passed since the last payment due date. In other embodiments, other amortization methods may be used. For example, a specified percentage of the payment amount may used toward payment of interest, with the remainder being applied to principal. In some embodiments, if the payment amount is insufficient to cover the interest that has accrued since the previous payment, the interest rate may be adjusted, and/or the term of the loan extended, to avoid negative amortization of the mortgage, i.e., an increase in the principal amount. Specified algorithm 530 may contain instructions for determining an adjustment to the term of the loan 540, and payment determination module 532 may compute the adjustment. In some embodiments, extensions to the term of a loan may be capped within the mortgage. In some embodiments, limits to the increase in the principal amount of the loan may be included in the mortgage. As should be evident to one of skill in the art, adjustment of the interest rate and/or the loan term, or even the capability of doing so, are not required features.

In embodiments where determined payment amount 536 depends on remaining principal 542, a value for remaining principal 542 may be sent from amortization module 538 to payment determination module 532. Of course in embodiments where the amortization schedule is known within payment determination module 532, the remaining principal may be computed within payment determination module 532.

In some embodiments, a lender such as a lending institution may enter into a number of loans or mortgages as described herein. By being the lender for a number of loans, fluctuations in the cash flow from borrower payments may be smoothed. For example, the realized incomes of certain borrowers may be lower than originally projected, while the realized income of other borrowers may be higher than originally projected. The resulting changes to expected cash flow may offset one another. When attempting to sell mortgages or loans on a secondary market, packaging two or more of the loans together may provide a more attractive offer.

Modules 501, 532, 538 and any other modules may be implemented in software, hardware and/or firmware. Data passed between the modules may be sent over a network, within the same application, or along any other suitable communication network(s) or link(s). In some embodiments, specified algorithm 530 may be generated, transmitted and/or used in an electronic or a non-electronic form. That is, generation and/or use of specified algorithm 530 may be done with or without the use of a computer system.

Payment schedules for each of a conventional, fixed rate mortgage and a mortgage structured according to one embodiment of the present invention are presented in Table 1. With a loan of $300,000, and annual interest rate of 6%, monthly payments, and a term of 30 years, the monthly payment amount for the conventional loan is $1,799. By contrast, Table 2 illustrates an example of a mortgage payment arrangement as taught herein, using an initial annual borrower income of $100,000, an annual income growth rate of 5% (monthly growth rate of 0.417%), and an algorithm specifying that the monthly payment amount be 0.964% of the borrower's estimated annual income. The illustrated embodiment provides for monthly payments ranging from $968 for the first month to $4,308 for the final month.

TABLE 1

| Selected Month | Payment | Interest | Remaining Principal | Total Payments |
|---|---|---|---|---|
| 1 | 1,799 | 1,500 | 299,701 | 1,799 |
| 13 | 1,799 | 1,482 | 295,999 | 23,382 |
| 25 | 1,799 | 1,462 | 292,068 | 44,966 |
| 37 | 1,799 | 1,441 | 287,895 | 66,550 |
| 49 | 1,799 | 1,419 | 283,464 | 88,134 |
| 61 | 1,799 | 1,396 | 278,760 | 109,718 |
| 73 | 1,799 | 1,371 | 273,766 | 131,302 |
| 85 | 1,799 | 1,345 | 268,464 | 152,885 |
| 97 | 1,799 | 1,317 | 262,835 | 174,469 |
| 109 | 1,799 | 1,287 | 256,859 | 196,053 |
| 121 | 1,799 | 1,255 | 250,514 | 217,637 |
| 133 | 1,799 | 1,222 | 243,778 | 239,221 |
| 145 | 1,799 | 1,186 | 236,626 | 260,804 |
| 157 | 1,799 | 1,148 | 229,033 | 282,388 |
| 169 | 1,799 | 1,108 | 220,972 | 303,972 |
| 181 | 1,799 | 1,066 | 212,414 | 325,556 |
| 193 | 1,799 | 1,021 | 203,327 | 347,140 |
| 205 | 1,799 | 973 | 193,681 | 368,724 |
| 217 | 1,799 | 922 | 183,439 | 390,307 |
| 229 | 1,799 | 867 | 172,566 | 411,891 |
| 241 | 1,799 | 810 | 161,022 | 433,475 |
| 253 | 1,799 | 749 | 148,766 | 455,059 |
| 265 | 1,799 | 684 | 135,754 | 476,643 |
| 277 | 1,799 | 616 | 121,940 | 498,226 |
| 289 | 1,799 | 543 | 107,274 | 519,810 |
| 301 | 1,799 | 465 | 91,703 | 541,394 |
| 313 | 1,799 | 383 | 75,171 | 562,978 |
| 325 | 1,799 | 296 | 57,620 | 584,562 |
| 337 | 1,799 | 203 | 38,987 | 606,146 |
| 349 | 1,799 | 104 | 19,204 | 627,729 |
| 360 | 1,799 | 9 | 0 | 647,515 |

TABLE 2

| Selected Month | Payment | Interest | Remaining Principal | Total Payments |
|---|---|---|---|---|
| 1 | 968 | 1,500 | 300,532 | 968 |
| 13 | 1,018 | 1,531 | 306,797 | 12,908 |
| 25 | 1,070 | 1,562 | 312,821 | 25,459 |
| 37 | 1,125 | 1,590 | 318,557 | 38,652 |
| 49 | 1,182 | 1,618 | 323,952 | 52,520 |
| 61 | 1,243 | 1,643 | 328,951 | 67,097 |
| 73 | 1,306 | 1,666 | 333,493 | 82,421 |
| 85 | 1,373 | 1,686 | 337,508 | 98,528 |
| 97 | 1,443 | 1,703 | 340,924 | 115,459 |
| 109 | 1,517 | 1,717 | 343,661 | 133,257 |
| 121 | 1,595 | 1,727 | 345,631 | 151,965 |
| 133 | 1,677 | 1,733 | 346,739 | 171,630 |
| 145 | 1,762 | 1,735 | 346,881 | 192,301 |
| 157 | 1,852 | 1,730 | 345,945 | 214,030 |
| 169 | 1,947 | 1,720 | 343,808 | 236,871 |
| 181 | 2,047 | 1,703 | 340,339 | 260,880 |
| 193 | 2,152 | 1,679 | 335,393 | 286,118 |
| 205 | 2,262 | 1,647 | 328,816 | 312,646 |
| 217 | 2,377 | 1,606 | 320,438 | 340,532 |
| 229 | 2,499 | 1,555 | 310,077 | 369,845 |
| 241 | 2,627 | 1,493 | 297,536 | 400,657 |
| 253 | 2,761 | 1,420 | 282,601 | 433,046 |
| 265 | 2,902 | 1,333 | 265,042 | 467,092 |
| 277 | 3,051 | 1,232 | 244,609 | 502,880 |
| 289 | 3,207 | 1,116 | 221,035 | 540,499 |
| 301 | 3,371 | 982 | 194,029 | 580,042 |
| 313 | 3,544 | 830 | 163,278 | 621,608 |
| 325 | 3,725 | 658 | 128,445 | 665,301 |
| 337 | 3,916 | 463 | 89,166 | 711,230 |
| 349 | 4,116 | 245 | 45,050 | 759,508 |
| 360 | 4,308 | 21 | 0 | 805,930 |

To determine a pre-qualification ceiling amount for a permitted collateralized loan, a lender may use an estimated future income of a prospective borrower and one or more guidelines regarding loan amounts. For example, the lender may limit the percentage of income that the borrower can plan to devote to loan payments. Or, in embodiments involving real estate, the lender may limit the percentage of income that the borrower can plan to devote to total real estates costs. For example, the lender may limit the percentage of income that a borrower can plan to devote to loan payments, insurance, real estate taxes, and home maintenance to 36%. Or, in some cases, the lender may limit the percentage of income that a borrower can plan to devote to loan payments to be 28%, or some other suitable percentage. The percentage limit may be different for different income levels, and the percentage limit may be modeled as varying during a loan term as the borrower's income level changes.

Due to more or less fixed costs for food, transportation, clothing, etc., a borrower may have a greater percentage of disposable income (housing costs aside) as income increases. So, a lender might only allow monthly payments for a $100,000 salary to be 28% but allows monthly payments of 45% for a $350,000 salary. In one embodiment, the mortgage terms may be that if income increases at two or more times inflation (e.g., CPI) for five years, the percentage allowed for monthly mortgage payments will step up accordingly.

Figure 6:
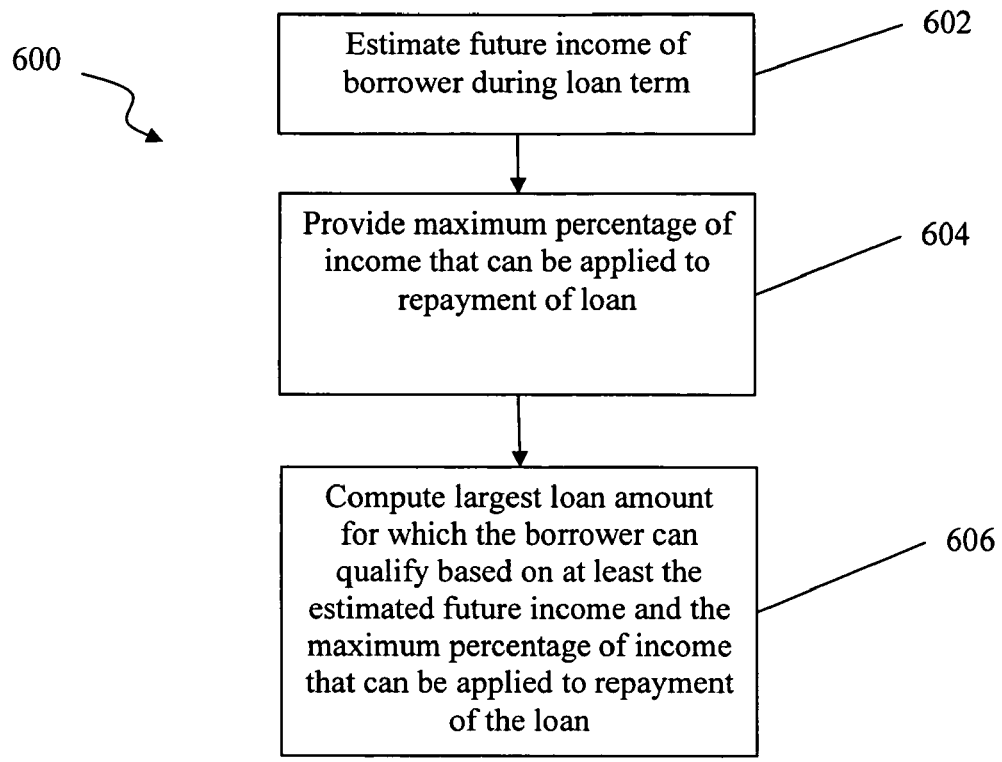

FIG. 6 illustrates one embodiment of a method 600 of generating a prequalification loan amount for a prospective borrower. In an act 602, an estimated income of the borrower is received, provided, or generated, and the estimate covers a substantial portion of the loan term such that the lender may make a reasonable determination as to the size of the loan for which the borrower qualifies. In an act 604, a guideline or rule is received, provided or generated regarding a maximum percentage of income that can be assumed to be usable for repayment of the loan and/or payment of relevant costs associated with the loan. In an act 606, the maximum loan amount that is repayable using the data from acts 602 and 604 is computed. It should be noted that method 600 does not require that the lender offer the loan amount computed in act 606, nor is the amount computed in act 606 necessarily considered to be the absolute maximum loan for which the borrower may qualify. The loan amount computed may be used as a data point for the pre-qualification of a borrower, and in some embodiments, various pre-qualification loan amounts may be calculated for a single prospective borrower by using various estimated incomes and/or maximum percentage guidelines.

Act 606 may be implemented in any one of a number of suitable approaches. For example, a spreadsheet model of loan repayments may be used, into which estimated income and maximum income percentage data is entered. The spreadsheet may be used to determine the maximum loan amount that is substantially repaid based on this data. In another embodiment, various loan amounts may be entered into the spreadsheet, and the percentage of income that would be devoted to loan payments may be computed. This percentage may then be compared to a guideline regarding income percentage that can be devoted to loan payments. In some embodiments, a single equation may be used to calculate a maximum loan amount based on the data provided to the equation as inputs.

It should be noted that for purposes herein, the term "percentage" is meant to encompass any computation of a portion of an amount. For example, a fraction of an income is considered to be a percentage of the income for purposes herein.

The methods and systems described herein, or any suitable portions thereof, may be computer-implemented in any way desired (e.g., using general or special purpose hardware or software, any type of processor element(s), etc.). Software running on a general purpose computer (e.g., a personal computer) can be used, for example, to implement data collection, data storage, data organization, data analysis, decision optimzation, and communication with investors such as portfolio managers. When a computer-based method is used, some or all of the data and communications may be encrypted using any acceptable cryptographic system, to protect the privacy and security of the data. The various data processing activities may be distributed over multiple processing elements, including non-collocated processing elements.

Some of the methods described herein and various embodiments and variations of the methods and acts, individually or in combination, may be defined by computer-readable signals tangibly embodied on more computer-readable media, for example, non-volatile recording media, integrated circuit memory elements, or a combination thereof. Computer readable media can be any available media that can be accessed by a computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can be accessed by a computer, and any suitable combination of the foregoing. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Each of the systems described herein and illustrated in FIGS. 1-6, and components thereof, may be implemented using any of a variety of technologies, including software (e.g., C, C#, C++, Java, Visual Basic, Fortran, Pascal, Eiffel, Basic, COBOL or a combination thereof), hardware (e.g., one or more application-specific integrated circuits), firmware (e.g., electrically-programmed memory) or any combination thereof. One or more of the components may reside on a single device (e.g., a computer), or one or more components may reside on separate, discrete devices. Further, each component may be distributed across multiple devices, and one or more of the devices may be interconnected.

Further, on each of the one or more devices that include one or more components of the systems, each of the components may reside in one or more locations on the system. For example, different portions of the components of these systems may reside in different areas of memory (e.g., RAM, ROM, disk, etc.) on the device. Each of such one or more devices may include, among other components, a plurality of known components such as one or more processors, a memory system, a disk storage system, one or more network interfaces, and one or more busses or other internal communication links interconnecting the various components. The systems, and components thereof, may be implemented using a computer system such as that described below in relation to FIGS. 7 and 8.

A general-purpose computer system according to one embodiment of the invention is configured to perform any of the functions described above. It should be appreciated that the system may perform other functions and the invention is not limited to having any particular function or set of functions.

Figure 7:
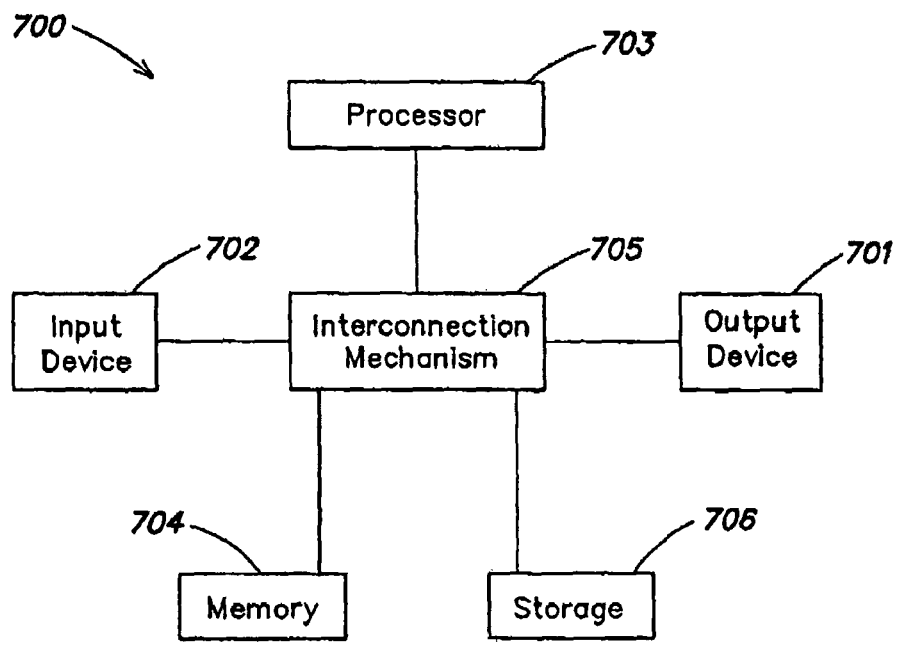
FIG. 7 is a block diagram illustrating an example of a computer system on which some embodiments of the invention may be implemented.

For example, various aspects of the invention may be implemented as specialized software executing in a general-purpose computer system 700 such as that shown in FIG. 7. The computer system 700 may include a processor 703 connected to one or more memory devices 704, such as a disk drive, memory, or other device for storing data. Memory 704 is typically used for storing programs and data during operation of the computer system 700. Components of computer system 700 may be coupled by an interconnection mechanism 705, which may include one or more busses (e.g., between components that are integrated within a same machine) and/or a network (e.g., between components that reside on separate discrete machines). The interconnection mechanism 705 enables communications (e.g., data, instructions) to be exchanged between system components of system 700. Computer system 700 also includes one or more input devices 702, for example, a keyboard, mouse, trackball, microphone, touch screen, and one or more output devices 701, for example, a printing device, display screen, speaker. In addition, computer system 700 may contain one or more interfaces (not shown) that connect computer system 700 to a communication network (in addition or as an alternative to the interconnection mechanism 705.

Figure 8:
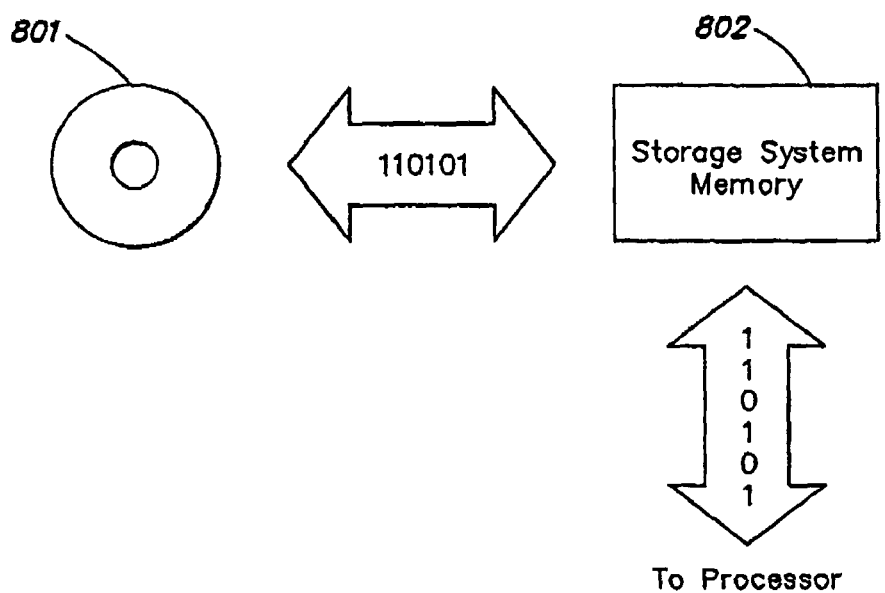
FIG. 8 is a block diagram illustrating an example of a storage system that may be used as part of the computer system to implement some embodiments of the invention.

The storage system 706, shown in greater detail in FIG. 8, typically includes a computer readable and writeable nonvolatile recording medium 801 in which signals are stored that define a program to be executed by the processor or information stored on or in the medium 801 to be processed by the program. The medium may, for example, be a disk or flash memory. Typically, in operation, the processor causes data to be read from the nonvolatile recording medium 801 into another memory 802 that allows for faster access to the information by the processor than does the medium 801. This memory 802 is typically a volatile, random access memory such as a dynamic random access memory (DRAM) or static memory (SRAM). It may be located in storage system 706, as shown, or in memory system 704. The processor 703 generally manipulates the data within the integrated circuit memory 704, 802 and then copies the data to the medium 801 after processing is completed. A variety of mechanisms are known for managing data movement between the medium 801 and the integrated circuit memory element 704, 802, and the invention is not limited thereto. The invention is not limited to a particular memory system 704 or storage system 706.

The computer system may include specially-programmed, special-purpose hardware, for example, one or more application-specific integrated circuits (ASICs). Aspects of the invention may be implemented in software, hardware or firmware, or any combination thereof. Further, such methods, acts, systems, system elements and components thereof may be implemented as part of the computer system described above or as an independent component.

Although computer system 700 is shown by way of example as one type of computer system upon which various aspects of the invention may be practiced, it should be appreciated that aspects of the invention are not limited to being implemented on the computer system as shown in FIG. 8. Various aspects of the invention may be practiced on one or more computers having a different architecture or components than that shown in FIG. 8.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol. The use of "including," "comprising," or "having," "containing", "involving", and variations thereof herein, is meant to encompass the items listed thereafter and equivalents thereof as well as additional items.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented system comprising:
a processor;
a memory containing a payment algorithm specification module;
the payment algorithm specification module configured to receive a value for each of a plurality of loan parameters associated with a collateralized loan from a lender to a borrower;
the payment algorithm specification module further configured to receive an estimated future income of the borrower for each of a plurality of time periods, wherein the estimated future income associated with a first time period differs from the estimated future income associated with a second time period; and
the payment algorithm specification module further configured to specify a payment algorithm for repaying the loan, wherein the payment algorithm specification module uses, as inputs for establishing the payment algorithm for repayment of the loan, the plurality of loan parameters and the borrower's estimated future income for each of at least the first and second time periods; and wherein
the payment algorithm specification module is configured to specify the payment algorithm such that the payment algorithm is configured to determine a payment amount for each of a plurality of time intervals, the payment amount for each of the time intervals to be based on a portion of a realized income value measured in the future for the then-completed time interval.

2. The system of claim 1, wherein the payment algorithm comprises an equation in which a multiplier is multiplied by a realized income.

3. The system of claim 2, wherein:
the plurality of loan parameters comprises a loan term, and a multiplier value is assigned to the multiplier such that a full repayment of the loan at approximately the end of the loan term would result if the borrower's realized incomes for each of the plurality of time periods were to equal the estimated future incomes of the borrower for each of the plurality of time periods.

4. The system of claim 2, wherein the plurality of loan parameters comprises a loan term, and a value for the multiplier is specified to remain constant throughout the loan term.

5. The system of claim 2, wherein the plurality of loan parameters comprises a loan term, and a value for the multiplier is specified to be changed during the loan term.

6. The system of claim 2, wherein the plurality of loan parameters comprises a loan term, and a value for the multiplier is specified to be predetermined during the loan term.

7. The system of claim 1, wherein the payment algorithm specification module is configured to receive specified times for measuring each of the realized incomes, and further configured to receive specified times for determining payment amounts applicable to associated selected time intervals based on the measured realized incomes.

8. The system of claim 7, wherein at least one of the specified times for measuring a realized income occurs at or before a beginning of a selected time interval associated with the at least one specified time.

9. The system of claim 7, wherein at least one of the specified times for measuring a realized income occurs at or after completion of a selected time interval associated with the at least one specified time.

10. The system of claim 1, wherein the processor is configured to receive a plurality of income ranges for the future income and a measured realized income value for a completed time interval, and the processor is configured to determine which range of the plurality of income ranges includes the measured realized income value; and the system further comprises a payment amount determination module which is configured to determine a payment amount based on the range that includes the measured realized income.

11. The system of claim 3, further comprising a computer configured to, at a future time for measuring a first realized income, compute an updated estimated future income of the borrower based on at least a first measured realized income value, and the computer being configured to determine an updated value for the multiplier, wherein said updated multiplier value would result in a full repayment of the loan at approximately the end of the loan term were a second realized future income to equal the updated estimated future income.

12. The system of claim 1, wherein the payment algorithm specifies a maximum payment amount limit.

13. The system of claim 1, wherein the payment algorithm specifies a minimum payment amount limit.

14. A computer-implemented system comprising:
a processor;
a memory containing a payment algorithm specification module;
the payment algorithm specification module configured to receive a value for each of a plurality of loan parameters associated with a collateralized loan from a lender to a borrower;
the payment algorithm specification module further configured to receive an estimated future income of the borrower for each of a plurality of time periods, wherein the estimated future income associated with a first time period differs from the estimated future income associated with a second time period; and
the payment algorithm specification module further configured to specify a payment algorithm for repaying the loan, wherein the payment algorithm specification module uses, as inputs for establishing the payment algorithm for repayment of the loan, the plurality of loan parameters and the borrower's estimated future income for each of at least the first and second time periods; and wherein
the payment algorithm specification module is configured to specify the payment algorithm such that the payment algorithm is configured to determine a payment amount for each of a plurality of time intervals, the payment amount for a first time interval to be based on a portion of the estimated future income of the borrower for the first time period, and the payment amount for a second time interval to be based on a portion of the estimated future income of the borrower for the second time period.

15. The system of claim 14, wherein the estimated future income is at least in part set forth in a table including estimated income values for the plurality of time periods.

16. The system of claim 14, wherein the estimated future income comprises a function which provides estimated future income values for each of the plurality of time periods using at least a baseline income and time as inputs.

17. The system of claim 14, wherein the algorithm for determining payment amounts is specified to determine a payment amount for a selected time interval as a function of a percentage of the estimated future income.

18. The system of claim 14, wherein the algorithm for determining payment amounts is specified to determine the payment amount for a selected time interval to be a percentage of the estimated future income.

19. The system of claim 17, wherein the percentage of the estimated future income is determined by applying a multiplier to the estimated future income.

20. The system of claim 19, wherein the plurality of loan parameters comprises a loan term and a value for the multiplier is specified to remain constant throughout the loan term.

21. The system of claim 19, wherein the plurality of loan parameters comprises a loan term and a value for the multiplier is specified to change during the loan term.

22. The system of claim 14, wherein the plurality of loan parameters comprises a loan term, and the specified algorithm is configured to determine payment amounts that will result in a full repayment of the loan at approximately the end of the loan term.

23. The system of claim 1, further comprising an amortization module which specifies an amortization schedule for payment amounts which are determinable with the payment algorithm, the amortization schedule specifying what amount of each payment amount is to be applied to paying interest and what amount of each payment amount is to be applied to paying principal.

24. The system of claim 1, wherein the payment algorithm includes instructions for having the lender share in appreciation of an asset with which the loan is collateralized.

25. The system of claim 1, wherein the payment algorithm includes instructions for having the lender share in appreciation of an asset with which the loan is collateralized if certain criteria are met.

26. The system of claim 1, wherein the payment algorithm includes instructions that when a payment amount applicable to a time interval is less than an amount of interest accrued during the time interval, the difference between the payment amount and the amount of interest accrued is to be added to a remaining principal.

27. The system of claim 1, wherein the payment algorithm includes instructions that a term of the loan is extended when a payment amount for a time interval is less than an amount of interest accrued during the time interval.

28. The system of claim 1, wherein the payment algorithm includes instructions that an interest rate applicable to a time interval is reduced at least by an amount that is sufficient to avoid negative amortization of the loan when a payment amount for the time interval is less than an amount of interest accrued during the time interval.

29. The system of claim 1, wherein the collateralized loan is a mortgage on certain real estate, and that real estate is the collateral.

30. The system of claim 1, wherein each of the estimated future incomes for each of the plurality of time periods differs from every other estimated future income for each of the plurality of time periods, and wherein the payment algorithm specification module is configured to use each of the plurality of time periods as an input.

31. The system of claim 1, wherein the estimated future income of the borrower for each of a plurality of time periods comprises projected future incomes of the borrower based at least on a profession of the borrower.

32. The system of claim 14, further comprising a payment amount determination module configured to calculate a plurality of future payment amounts using the payment algorithm and the estimated future income of the borrower for each of the plurality of time periods.

* * * * *